United States Patent [19]

Rodriguez et al.

[11] Patent Number: 5,352,425
[45] Date of Patent: Oct. 4, 1994

[54] SORBENT FOR TREATMENT OF EFFLUENT GAS STREAM

[75] Inventors: Domingo Rodriguez, Miranda, Venezuela; Roy Payne, Mission Viejo, Calif.; Cebers O. Gómez, Miranda, Venezuela

[73] Assignee: Intevep, S.A., Caracas, Venezuela

[21] Appl. No.: 164,480

[22] Filed: Dec. 9, 1993

Related U.S. Application Data

[62] Division of Ser. No. 898,121, Jun. 12, 1992, Pat. No. 5,282,999.

[51] Int. Cl.$^5$ .................... B01J 8/00; C01B 17/00; C09K 3/00
[52] U.S. Cl. .................... 423/244.07; 423/244.01; 423/244.10; 252/189; 252/190; 252/191; 252/192
[58] Field of Search ............. 252/189, 190, 191, 192; 423/244.01, 244.07, 244.10

[56] References Cited

U.S. PATENT DOCUMENTS 3,761,570  9/1973  Lowicki et al. ............. 423/244.07
4,191,115  3/1980  Yang et al. ................. 110/347
4,731,233  3/1988  Thompson et al. ........... 423/231
5,270,025  12/1993  Ho et al. .................. 423/244.07

*Primary Examiner*—Richard D. Lovering
*Assistant Examiner*—Jospeh D. Anthony
*Attorney, Agent, or Firm*—Bachman & LaPointe

[57] ABSTRACT

A process for producing a sulfur sorbent composition in a mixer having a mixer paddle an energy supply is disclosed which includes hydrating an alkaline earth metal oxide in an aqueous solution containing a promoting additive selected from a group consisting of urea and mixtures of urea with a water soluble iron salt under high intensity mixing conditions with the mixer wherein the mixer is operated at a mixer paddle tip velocity of at least 500 ft/min and a mixer energy input of at least 3.5 kW-h per ton of sorbent so as to produce a sulfur sorbent composition having the following physical and chemical properties: alkaline earth metal (wt. %)—4-0-52, molar ratio of promoting additive to alkaline earth metal—0.001-0.2, bulk density (g/ml)—0.35-0.75, surface area (m$^2$/g)—5-25, pore volume (cc/g)—0.05-0.14 and mean particle size (um)—4.

5 Claims, 1 Drawing Sheet

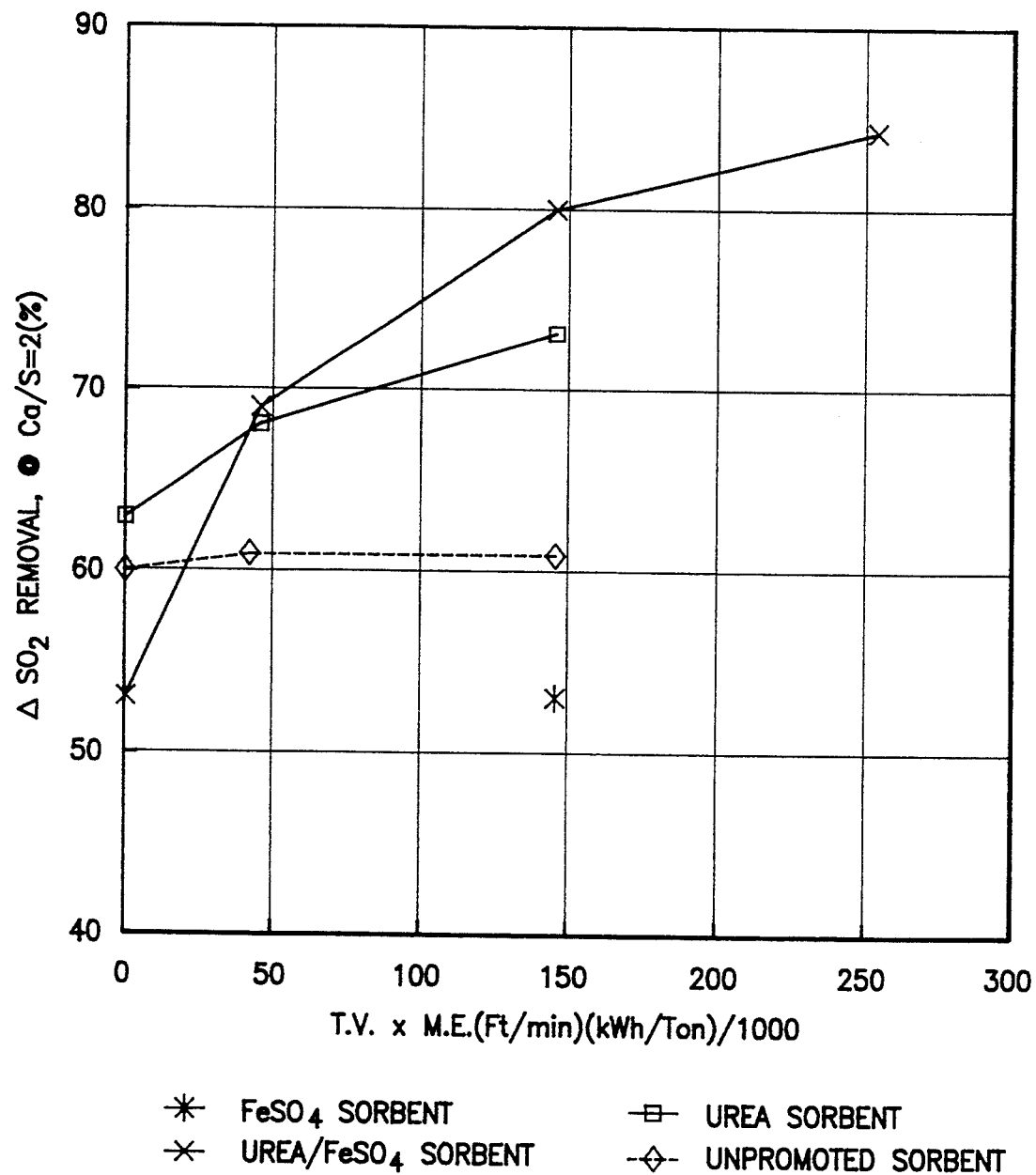

SORBENT FOR TREATMENT OF EFFLUENT GAS STREAM

This is a division of application Ser. No. 07/898,121, filed Jun. 12, 1992 now U.S. Pat. No. 5,282,999.

BACKGROUND OF THE INVENTION

The present invention relates to a process for producing a sulfur sorbent composition for use in removing sulfur oxides from a stream of effluent gas and the resultant sorbent produced.

Desulfurization of effluent gas is achieved by various procedures known in the art. One known procedure is to treat the effluent gas with sorbents, such as calcium carbonate or calcium hydroxide.

Such sulfur sorbents are the subject, for example, of U.S. Pat. No. 4,424,197 to Powell et al. This patent discloses the use of CaO prepared by flash calcination of a special type of aragonite sand, thus generating a CaO product which reacts with $SO_2$. This procedure has economic drawbacks due to the special raw material required and the necessary flash calcination procedure.

When commercial calcium carbonate or hydroxide is used, however, sulfur reactivity is generally unsatisfactory. Various approaches have been reported wherein improvement of sulfur reactivity is attempted.

Several disclosures have been made regarding the use of urea as an additive to hydrated calcium in order to remove $NO_x$ compounds from gas streams, or to simultaneously remove $SO_2$ and $NO_x$.

U.S. Pat. No. 4,731,233 discloses a process in which urea is incorporated into $Ca(OH)_2$ by dissolving urea into the hydration water. The '233 patent discloses that the urea additive does not harm the reactivity of the sorbent towards $SO_2$. No particular hydration procedures are indicated in the '233 patent.

Such urea promoted sorbents, prepared conventionally, yield sorption rates up to a maximum of about 60% at molar ratios of Ca to sulfur of about 2.

Metal salts have been used as additives to try to improve the sulfur reactivity of calcium based sorbents. For example, Muzio et al presented a paper entitled "The Effectiveness Of Additives For Enhancing $SO_2$ Removal With Calcium Based Sorbents" at the 1986 Joint Symposium on Dry $SO_2$ and Simultaneous $SO_2$/$NO_x$ Control Technologies (EPRI Proceeding CS-4996, Vol. I, pp. 13-23). This paper reports that the incorporation of iron into the hydration water had no significant effect on $SO_2$ capture.

Slaughter et al. presented a paper entitled "Enhanced Sulfur Capture By Promoted Calcium-based Sorbent" at the aforesaid 1986 Joint Symposium (EPRI Proceedings CS-4996, Vol. I, pp. 12-24). This paper indicates that the physical mixture of $Fe_2O_3$ to $Ca(OH)_2$ had no significant enhancing effect on the sorbent reactivity toward $SO_2$ during in-furnace sorbent injection experiments.

U.S. Pat. No. 4,191,115 discloses a method for enhancing the $SO_2$ absorption of limestone used during a fluidized bed combustion of carbonaceous fuels. According to the '115 patent, limestone is sprayed with a mixture of iron sulfate and iron sulfite in a separate chamber before the limestone is injected into the fluidized bed combustor. The sulfation data presented in the '115 patent indicate that 3 hours are needed to obtain particle sulfation levels of 60%.

Thus, the state of the art indicates that urea yields no improved results for $SO_2$ removal, and that iron is not an effective promoter for sulfur sorbents.

In light of the above, it can be seen that there is a need for a sulfur sorbent composition which is not costly to prepare and which does not require expensive starting materials.

It is therefore the principal object of the present invention to provide a process for preparing a sulfur sorbent composition which is effective and inexpensive to produce.

It is still a further object of the present invention to provide a process for producing a sorbent using iron and urea additives to enhance $SO_2$ removal.

Other objects and advantages will become readily apparent to a person skilled in the art upon consideration of the following description of the invention.

SUMMARY OF THE INVENTION

The foregoing objects and advantages are obtained by a process for the production of a sulfur sorbent composition in a mixer having a mixer paddle and an energy supply for supplying energy to the mixer comprising hydrating an alkaline earth metal oxide in an aqueous solution containing a promoting additive selected from a group consisting of urea and mixtures of urea with a water soluble iron salt under high intensity mixing conditions with said mixer wherein said mixer is operated under the following parameters: mixer paddle tip velocity of at least 500 ft/min; and energy input to the mixer of at least 3.5 kW-h per ton of sorbent. This energy input is measured in terms of total energy input to the mixer.

According to the invention, a sulfur sorbent composition is produced having the following physical and chemical properties:

- alkaline earth metal (wt %)—about 40–52;
- molar ratio of promoting additive to alkaline earth metal—0.001–0.2;
- bulk density (g/ml)—about 0.25–0.95;
- surface area (m$^2$/g)—about 3–75;
- pore volume (cc/g)—about 0.02–0.20;
- mean particle size (μm)—< about 6.0

Preferred alkaline earth metal oxides include calcium oxide, magnesium oxide, and mixtures thereof.

The preferred promoting additive is a mixture of urea and an iron salt selected from a group consisting of ferrous sulfate, ferric sulfate, ferrous chloride, ferric chloride, ferrous nitrate, ferric nitrate, and mixtures thereof.

The mixing intensity is preferably defined by a mixer paddle tip velocity exceeding about 1000 ft/min, and more preferably still in the range of about 6000 to 9000 ft/min. Energy is preferably supplied to the mixer at a rate of at least 3.5 kW-h per ton of sorbent, more preferably at least 4.0 kW-h/ton of sorbent, and at a mixing time of less than about 15 seconds.

BRIEF DESCRIPTION OF THE DRAWING

A detailed description of the invention follows, with reference to the accompanying drawing, in which:

FIG. 1 is a graph illustrating the relation between mixing intensity and $SO_2$ removal.

DETAILED DESCRIPTION

The present invention is drawn to a process for producing a sorbent for use in reducing $SO_2$ contained in an effluent stream of gas and a resultant sorbent product.

More particularly, the process includes the steps of dissolving a promoting additive in water to provide an aqueous solution and hydrating an alkaline earth metal oxide with the aqueous solution under high mixing intensity to provide a sorbent having enhanced $SO_2$ reactivity.

According to the invention, the promoting additive is preferably urea which may be mixed with one of more water soluble iron salts. While many iron salts are suitable, such as, for example, ferrous sulfate, ferric sulfate, ferrous chloride, ferric chloride, ferrous nitrate, ferric nitrate, and mixtures thereof, ferrous sulfate is particularly suitable because of its low cost.

Suitable alkaline earth metal oxides include calcium oxide, magnesium oxide, and mixtures thereof. Improved results are obtained, according to the invention, when the metal oxide is ground so as to provide a grain size wherein 90% of the particles are smaller than about 250 microns.

Water is preferably provided for the hydration at least in stoichiometric amounts, that is, 32 lb of water per 100 lb of CaO. The preferred upper limit for water is set by the maximum amount of water which can be used to produce a dry $Ca(OH)_2$ product. A sufficiently dry product can be obtained when up to 75 lbs of water are used per 100 lbs of CaO. The ratio by weight of water to CaO is, therefore, preferably between about 32:100 to 75:100. A preferred ratio of water to CaO is between about 45:100 to 70:100.

As a promoting additive, urea is added to the hydration water in amounts sufficient to provide a molar ratio of urea to calcium of between about 0.001 to 0.2, preferably between about 0.005 to 0.075. Ferrous sulfate is also preferably added to the hydration water in amounts sufficient to provide a molar ratio of iron to calcium of between about 0.001 to 0.2, preferably between about 0.005 to 0.075.

Once the above promoting additives are completely dissolved in the hydration water, the resulting solution is added to a mixer containing the calcium oxide.

It is critical, according to the invention, to provide a high intensity mixing in order to obtain a final product sorbent from the aforesaid ingredients having improved reactivity to $SO_2$. Conventional commercial quicklime hydration plants use blenders typically having paddles. The mixing intensity used in such conventional hydration procedures can be defined based on a tip velocity of the mixing paddle and energy supplied to the blender. Conventional quicklime hydration is typically carried out at energy or power inputs of about 0.4 kW-h/ton of sorbent and mixing paddle tip velocity of about 155 to 315 ft/min. with mixing times exceeding 5 minutes.

At conventional mixing intensity, urea and iron are ineffective as promoters for calcium oxide based sulfur sorbent. It has been found, according to the invention, that high intensity mixing, characterized by a mixer paddle tip velocity of at least about 500 ft/min, preferably at least about 1000 ft/min, most preferably between about 6000 to t9000 ft/min, and an energy input to the mixer of at least about 3.5 kW-h/ton of sorbent, preferably at least about 4.0 kW-h/ton of sorbent, and mixing times less than about 15 seconds, provide sorbents in which, surprisingly, urea is a much more effective promoter and urea/iron is an extremely effective promoter.

Suitable high intensity mixing can be obtained, according to the invention, by a high speed single rotor mixer. Such a continuous mixer has a Single rotating shaft that carries paddles enclosed in a cylindrical shell. This type of mixer can provide a tip velocity of at least about 500 ft/min with an energy requirement of at least about 3.5 kW-h/ton, under normal mixer loading conditions. The energy rates contained herein refer to total energy supplied to the mixer by the energy supply, and not net energy (net energy=energy loaded-energy unloaded).

As can be seen, the mixing intensity intended for use with the present invention is markedly higher than that conventionally utilized in quicklime hydration plants. This increased mixing intensity provides a urea or urea/iron promoter sorbent having an improved reactivity to $SO_2$ as will be illustrated by the following Examples.

The high intensity mixing is preferably carried out with the hydration components at an initial temperature below about 100° C., and hydration pressure preferably less than about 10 atmospheres, more preferably about 1 atmosphere.

When high mixing intensity is applied to the promoter/calcium oxide mixture, the mixing procedure typically takes less than about 15 seconds. The sorbent at this point may still contain excess water. Accordingly, a two stage process is preferably utilized to remove excess water. The first stage is, according to the invention, the application of high intensity mixing to the aqueous solution and the quicklime in a suitable mixer. This mixing normally lasts for a period of time less than about 15 seconds. The second stage includes passing the solution-quicklime mixture to a seasoning chamber where the hydration reaction is completed under low intensity mixing conditions and where excess water is steamed off for a period of time generally less than about 10 minutes.

This two stage procedure ensures a dry product despite the short reaction time dictated by the high intensity mixing.

According to this procedure, a promoted sorbent product is formed which yields excellent reduction of $SO_2$ from streams of effluent gas.

The sorbent product comprises a hydrated alkaline earth metal oxide composition containing a promoting additive. As stated above, the alkaline earth metal is preferably selected from a group consisting of calcium oxide, magnesium oxide, and mixtures of calcium oxide and magnesium oxide.

The promoting additive is preferably either urea or mixtures of urea and an iron salt such as, for example, ferrous sulfate, ferric sulfate, ferrous chloride, ferric chloride, ferrous nitrate, ferric nitrate, and mixtures thereof. As stated above, ferrous sulfate is the presently preferred iron salt because it is relatively inexpensive.

The sulfur sorbent is characterized by the following physical and chemical properties:
 calcium (wt %)—about 40-52%;
 molar ratio of promoting additive to calcium—about 0.001-0.2;
 bulk density (g/ml)—about 0.25-0.95;
 surface area ($m^2$/g)—about 3-75;
 pore volume (cc/g)—about 0.02-0.20; and
 mean particle size ($\mu$m)—< about 6.0.

More preferably, the sulfur sorbent composition will have the following properties:
 bulk density (g/ml)—about 0.35-0.75;
 surface area ($m^2$/g)—about 5-25;
 pore volume (cc/g)—about 0.05-0.14; and
 mean particle size ($\mu$m)—$\leq$ about 4.

With reference to the molar ratio of promoting additive to calcium, a preferred promoting additive is urea at a molar ratio to Ca of about 0.001 to 0.2 and ferrous sulfate in sufficient amounts to provide a molar ratio of iron to Ca of about 0.001 to 0.2. More preferably, each of these molar ratios is about 0.005 to 0.075.

In use, the sorbent according to the invention is injected or admixed in particle form with an effluent gas stream at a point preferably downstream of the combustion zone. The injection is preferably carried out at a point in the stream where the temperature of the stream is between about 900° C. to 1200° C., and more preferably, where the temperature is about 1050° C. to 1200° C. In a typical boiler, the contact time of the sorbent particle with the effluent gas at this temperature is generally less than about 2 seconds. Sorbent is preferably admixed with the effluent gas in order to provide a ratio of alkaline earth metal to sulfur in the effluent gas stream of about three or less. The sorbent according to the invention exhibits enhanced $SO_2$ reactivity under this time constraint.

Two Examples follow which are presented in order to demonstrate the improvements of the present process and sorbent over those of the prior art.

EXAMPLE I

This example demonstrates the enhanced results obtained by the promoted sorbent of the present invention prepared using increased mixing intensity according to the present invention.

Three sorbents were prepared, and identified as sorbents A, B and C, in order to compare the effectiveness of sorbents prepared according to the procedures of U.S. Pat. No. 4,731,233 (sorbents A and B), using known hydration techniques, to the effectiveness of sorbents prepared according to the present invention (sorbent C). These sorbents were prepared as follows:

Sorbent A 100 grams of calcium oxide were hydrated with 65 grams of water. These figures are identical to those employed in the '233 patent in Test No. 1 of Group No. 1 in Example 1. The sorbent was prepared following standard procedures for preparation of hydrates, that is, the solution was combined with calcium oxide and the mixture was stirred with conventional levels of intensity (tip velocity of 251 ft/min., energy input of 1.1 kW-h per ton of sorbent) to assure that all calcium oxide was converted to calcium hydroxide by reaction with water.

Sorbent B 100 grams of calcium oxide were hydrated in 65 grams of a water solution containing 5.25 grams of urea. These figures are identical to those used in Test Nos. 2 and 3 of Test Group No. 1 and all of the tests of Test Group No. 2 as set forth in Example 1 of the '233 patent. This sorbent was also prepared following conventional procedures for preparation of hydrates. Thus, the solution was combined with the calcium oxide and mixed at conventional mixing intensities (tip velocity of 251 ft/min., energy input of 1.1 kW-h per ton) sufficient to assure that all calcium oxide was converted to calcium hydroxide by reaction with water.

Sorbent C

This sorbent was prepared, according to the present invention, by hydrating 100 grams of calcium oxide and 65 grams of a water solution containing 5.25 grams of urea. These amounts are identical to those used for sorbent B above. The solution and the calcium oxide were fed to the continuous mixer, and stirred at a mixing intensity much higher than those used in conventional processes. The mixing intensity which was employed is defined by a tip velocity of the mixing blades of 3533 ft/min. The energy supplied to the mixer for Sorbent C was 41 kW-h per ton.

Testing conditions employed in the '233 patent were reproduced in accordance with the teachings of that patent. Thus, the combustion products were generated by burning known amounts of natural gas and air in an 8 inch diameter combustion tunnel. The $SO_2$ at the point where the sorbent was injected was controlled by adding $SO_2$ to the natural gas. The nitrous oxide at the point of sorbent injection was controlled by adding $NH_3$ to the natural gas, a portion of which was converted to nitrous oxide during combustion of the natural gas. The temperature at the point of sorbent injection was measured by a thermocouple and controlled by (1) water cooled heat exchanger tubes upstream of the point of the sorbent injection, (2) the amount of natural gas burned and (3) backfire burners surrounding the combustion tunnel. The amount of oxygen in the combustion products was controlled by varying the relative amounts of gas and air. The sorbent was contacted with the stream of combustion products by using a screw feeder to add the sorbent in an air stream.

The testing summarized in Table 1 was carried out at two testing conditions, identified in the table as testing conditions 1 and 2.

Sorbent performance is reported in terms of $\Delta SO_2$ at Ca/S=2. This value is calculated according to the following equation:

$$\Delta SO_2 @ Ca/S = 2 = \frac{(SO_2)_{input} - (SO_2)_{output}}{(SO_2)_{input}} \times \frac{2}{(Ca/SO_2)} \times 100$$

With this equation, it is possible to standardize the various results obtained from experiments using different ratios of calcium to sulfate. Obviously, higher values of $\Delta SO_2$ imply a larger removal of $SO_2$ and, therefore, a more reactive material. Sorbents promoted with urea and hydrated under conditions of high mixing intensity, in accordance with the present invention, yield values of $\Delta SO_2$, exceeding 65%. As can be seen in Table 1, the preferred process temperature range of 1050° C. to 1200° C. yields a more markedly improved $\Delta SO_2$.

TABLE 1

| Test Cond. | Sorb. | Hydrated Sorbent | | | | Combustor Conditions | | |
|---|---|---|---|---|---|---|---|---|
| | | CaO gm | H2O/urea sol gm/gm | Tip vel (ft/min) | Mix Ener (Kw/ton/hr) | T (°C.) | Res. time (sec) | O2 vol % (dry) |
| 1 | A | 100 | 65/0 | 251 | 1.13 | 954 | 0.38 | 9.9 |
| 1 | B | 100 | 65/5.25 | 251 | 1.13 | 954 | 0.38 | 9.9 |
| 1 | C | 100 | 65/5.25 | 3533 | 41 | 954 | 0.38 | 9.9 |

TABLE 1-continued

| | | | | | | | | |
|---|---|---|---|---|---|---|---|---|
| 2 | A | 100 | 65/0 | 251 | 1.13 | 1121 | 0.35 | 7.9 |
| 2 | B | 100 | 65/5.25 | 251 | 1.13 | 1093 | 0.35 | 7.8 |
| 2 | C | 100 | 65/5.25 | 3533 | 41 | 1093 | 0.35 | 7.9 |

| | Sorbent Injection Ratios | | Input | | Output | | Removal | |
|---|---|---|---|---|---|---|---|---|
| Test Cond. | Ca/SO2 mol ratio | Urea/NO mol ratio | SO2 ppm (dry) | NO ppm (dry) | SO2 ppm (dry) | NO ppm (dry) | ΔSO2 @ Ca/S = 2 % | ΔNO₁ % |
| 1 | 1.66 | 0 | 2480 | 495 | 1240 | 480 | 60 | 3 |
| 1 | 2.16 | 0.47 | 2400 | 505 | 780 | 170 | 62 | 66 |
| 1 | 2.01 | 0.43 | 2360 | 505 | 760 | 270 | 67 | 47 |
| 2 | 1.42 | 0 | 2228 | 488 | 1280 | 473 | 60 | 3 |
| 2 | 2.52 | 0.49 | 2190 | 515 | 460 | 333 | 63 | 35 |
| 2 | 1.91 | 0.41 | 2480 | 533 | 720 | 355 | 74 | 33 |

By comparing sulfur removal results for sorbents A and B, under conditions 1 and 2, it is clear that the addition of urea to the sorbent employing standard hydration procedures has minimal impact, if any, on the reaction between $SO_2$ and CaO. This is the same conclusion reached in the '233 patent.

By comparing results from sorbents A and C, however, a clear enhancement in sulfur removal is observed. This improvement is more drastic under the preferred conditions represented by test condition 2. Although sorbents B and C appear to have the same composition, it is clear that the special hydration conditions disclosed as part of the process of the present invention (high mixing intensity) must provide some difference between the sorbents as sorbent C yields on enhanced reactivity to $SO_2$.

EXAMPLE II

This Example demonstrates the improved performance of sorbents promoted with urea additives, and the further improved performance of sorbent promoted with urea/$FeSO_4$ additives, when such sorbents are prepared under conditions of high intensity mixing.

The starting material for all sorbents of this example was a pulverized commercial pebble Linwood calcium oxide having a particle size at least 90% below 250 microns. Table 2 sets forth the compositions, hydration conditions and morphology for 11 sorbents prepared and tested.

TABLE 2

Summary of Sulfation Results

| | Sorbent Composition | | Hydration Conditions | | | Reaction Conditions | | |
|---|---|---|---|---|---|---|---|---|
| Sorbent Number | Fe/Ca (molar) | Urea/Ca (molar) | Tip Vel (ft/min) | Mix Energy (Kw/ton/hr) | (Vel)-(E) (ft/min)-(Kw/ton/h) | T (°C.) | Ca/S (molar) | SO2 in (ppm) |
| 1 | 0 | 0 | 251 | 1.13 | 284 | 1121 | 1.42 | 2228 |
| 2 | 0 | 0 | 1177 | 39.8 | 46845 | 1093 | 2.24 | 2360 |
| 3 | 0 | 0 | 3532 | 41.2 | 145518 | 1121 | 2.44 | 2365 |
| 4 | 0 | 0.05 | 251 | 1.13 | 284 | 1093 | 2.52 | 2190 |
| 5 | 0 | 0.05 | 1177 | 39.8 | 46845 | 1093 | 2.02 | 2480 |
| 6 | 0 | 0.05 | 3532 | 41.2 | 145518 | 1093 | 1.91 | 2480 |
| 7 | 0.03 | 0 | 3532 | 41.2 | 145518 | 1100 | 1.71 | 2500 |
| 8 | 0.03 | 0.05 | 251 | 1.13 | 284 | 1093 | 4.59 | 2480 |
| 9 | 0.03 | 0.05 | 1177 | 39.8 | 46845 | 1121 | 1.63 | 2400 |
| 10 | 0.03 | 0.05 | 3532 | 41.2 | 145518 | 1147 | 1.48 | 2080 |
| 11 | 0.03 | 0.05 | 5299 | 47.8 | 253292 | 1121 | 2.05 | 2240 |

| | Reaction Conditions | | Sorbent Morphology | | | | | | |
|---|---|---|---|---|---|---|---|---|---|
| | | | Calcined | | | Fresh | | | |
| Sorbent Number | SO2 out (ppm) | ΔSO2 @ Ca/S = 2 (%) | S.A. (m2/g) | Pore Vol. (cc/g) | Poros. c | S.A. (m2/g) | Pore Vol. (cc/g) | Bulk Dens. (g/ml) | Real Dens. (g/ml) |
| 1 | 1280 | 60 | 17.3 | 0.102 | 0.256 | 24.9 | 0.135 | n.a. | 2.15 |
| 2 | 740 | 61 | n.a. | n.a. | n.a. | 36.1 | 0.158 | 0.48 | 2.75 |
| 3 | 610 | 61 | 17.2 | 0.106 | 0.263 | 35.2 | 0.192 | 0.54 | 2.16 |
| 4 | 460 | 63 | 21.3 | 0.147 | 0.332 | 32.9 | 0.133 | 0.56 | 2.73 |
| 5 | 780 | 68 | 19.1 | 0.145 | 0.329 | 39.0 | 0.157 | 0.62 | 2.84 |
| 6 | 720 | 74 | 21.1 | 0.155 | 0.344 | 23.9 | 0.128 | 0.52 | 2.14 |
| 7 | 1367 | 53 | na | na | na | na | na | na | na |
| 8 | 1435 | 53 | 14.7 | 0.103 | 0.260 | 32.2 | 0.110 | 0.62 | 2.16 |
| 9 | 1050 | 69 | 14.9 | 0.117 | 0.284 | 14.1 | 0.069 | 0.60 | 2.64 |
| 10 | 849 | 80 | n.a. | n.a. | n.a. | n.a. | n.a. | n.a. | n.a. |
| 11 | 320 | 84 | 15.1 | 0.121 | 0.291 | 20.0 | 0.094 | 0.55 | 2.73 | na - no data taken.

The $SO_2$ capture performance of the sorbent presented in this example was measured in the same combustion tunnel used in Example I. The flue gas temperature was maintained at about 1100° C. The oxygen level was maintained at about 3.5% by volume (on a dry basis), and the residence time for the sorbent was about 0.38 seconds. These conditions are similar to those encountered with dry sorbent injection in commercial boilers.

These sorbents, as indicated in Table 2, were prepared at both conventional and high mixing intensities, and were prepared using hydration solutions which were non-promoted, promoted with urea only, promoted with iron only, and promoted with combinations of urea and iron.

FIG. 1 sets forth the relationship between mixing intensity here represented by a product of tip velocity times mixing energy, versus the percentage of $SO_2$ removal at a Ca/S ratio of 2. As can be seen, the increased mixing intensity had little effect on an unpromoted sorbent. Further, the sorbent in which only iron was added demonstrated a decrease in $SO_2$ removal. Confirming the improvement of the present invention, however, the sorbent promoted with urea and hydrated at high mixing intensity showed a marked improvement in $SO_2$ removal. Further, the sorbent promoted with a combination of urea and $FeSO_4$ and hydrated at high mixing intensity (sorbents 9, 10 and 11) demonstrated an even more drastic improvement ($\Delta SO_2 = 75\%$ and greater) over $SO_2$ removal rates obtained by conventionally prepared sorbents.

Thus disclosed is a process for producing a sorbent for treatment of effluent gas streams. The process utilizes conditions of high mixing intensity which yields a sulfur sorbent product exhibiting, as shown in Table 2, a 30–60% improvement in sulfur capture as compared to sorbents produced conventionally.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for reducing the sulfur oxide concentration of an effluent gas stream comprising admixing with said effluent gas stream a sulfur sorbent composition comprising a hydrated alkaline earth metal oxide and a promoting additive mixture of urea and water soluble iron salts; said sorbent composition having the following properties:
   alkaline earth metal (wt. %)—about 40–52;
   molar ratio of promoting additive mixture to alkaline earth metal—about 0.001–0.2;
   wherein said admixing is carried out at a temperature of between about 900° C. to about 1200° C. for a period of less than about 2.0 seconds and provides at least a 65% reduction in the sulfur content of the treated gas stream.

2. A process according to claim 1, wherein said admixing is carried out at a temperature of between about 1050° C. to 1200° C. for a period of less than about 2.0 seconds.

3. A process according to claim 1, including admixing said sorbent in amounts sufficient to provide a ratio of alkaline earth metal to sulfur in the effluent gas stream of about three or less.

4. A process according to claim 1, wherein said admixing step further includes admixing a sulfur sorbent composition having the following properties:
   alkaline earth metal (wt. %)—about 40–52;
   molar ratio of promoting additive to alkaline earth metal in said alkaline earth metal oxide—about 0.001–0.2;
   bulk density (g/ml)—about 0.25–0.95;
   surface area (m²/g)—about 3–75;
   pore volume (cc/g)—about 0.02–0.20; and
   mean particle size (μm)—< about 6.0.

5. A process according to claim 1, wherein said admixing step further includes admixing a sulfur sorbent composition having the following properties:
   alkaline earth metal (wt. %)—about 40–52;
   molar ratio of promoting additive to alkaline earth metal in said alkaline earth metal oxide—about 0.001–0.2;
   bulk density (g/ml)—about 0.35–0.75;
   surface area (m²/g)—about 5–25;
   pore volume (cc/g)—about 0.05–0.14; and
   mean particle size (μm)—≦ about 4.0.

* * * * *